United States Patent [19]

Marazzi et al.

[11] Patent Number: 5,348,487
[45] Date of Patent: Sep. 20, 1994

[54] PLUG CONNECTOR FOR OPTICAL FIBERS

[75] Inventors: Silvio Marazzi, Cavigliano; Silverio De Marchi, Contra, both of Switzerland

[73] Assignee: Diamond SA, Losone, Switzerland

[21] Appl. No.: 59,359

[22] Filed: May 11, 1993

[30] Foreign Application Priority Data

May 20, 1992 [CH] Switzerland ............ 1625/92-0
Dec. 8, 1992 [EP] European Pat. Off. ........ 92810963.6

[51] Int. Cl.$^5$ ............................................. H01R 13/00
[52] U.S. Cl. .................................................. 439/138
[58] Field of Search ............................ 439/135–138, 439/142, 146, 149

[56] References Cited

U.S. PATENT DOCUMENTS

| | | | |
|---|---|---|---|
| 4,176,897 | 12/1979 | Cameron | 439/138 |
| 4,352,492 | 10/1982 | Smith | 439/138 |
| 4,775,327 | 10/1988 | Normann et al. | |

FOREIGN PATENT DOCUMENTS

| | | | |
|---|---|---|---|
| 232792 | 8/1987 | European Pat. Off. | 439/138 |
| 2112173 | 7/1983 | United Kingdom | |

Primary Examiner—Joseph H. McGlynn
Attorney, Agent, or Firm—Shoemaker and Mattare Ltd.

[57] ABSTRACT

The connector pin (2) is protected by a lid (6) which is opened into the sleeve portion (3) when the plug portion (1) is slid in linearly. For this purpose, a sleeve portion is provided with a control path, for example in the form of guide grooves (30), which coordinates with the cover (6). When withdrawing the plug portion (1), the lid (6) is once again closed with the aid of the control path.

12 Claims, 7 Drawing Sheets

PLUG CONNECTOR FOR OPTICAL FIBERS

This invention concerns a plug connector for optical fibers; As opposed to electrical plug connectors, with optical plug connectors even slight contamination can lead to transmission losses, since glass fibers possessing the smallest of cross sections must be aligned with one another, face to face. Protective devices have already been anticipated, therefore, with the aid of which the connector pin can be protected when the plug is not inserted.

Until now, however, these types of protective devices have only been provided on relatively sturdy plug connectors for deployment in the field. EP-A-22 000, for example, shows a protective device for a connector which can also be used with optical fibers. The basic principle of the protective device is that the connector pins are covered by two superimposed discs. The discs are able to be rotated in relation to one another about a common axis, and are provided with openings which lie one above the other, to converge in at least one relative position and in this way expose the connector pins. The connector pins can then, with a movement running parallel to their axis, be extended through the openings and inserted into the connector sleeves. The disadvantage of that type of protective device is that it is only suitable for heavy duty connector plug portions with a certain outer diameter. In order to insert the plug portion, not only a rotational movement but also a linear displacement must be carried out. For small plug portions, for example those finding increasing use in the measurement, newscasting and entertainment technologies, the known device is not suitable.

It is therefore a purpose of the invention to create a plug connector of the type mentioned in the introduction, which reliably protects the connector pin from dust, finger print and water splash contamination etc., possesses the simplest construction also with small scale connectors, and in addition is easy to handle. This purpose is, according to the invention, solved with a connector possessing the features in claim 1, respectively claim 14. The cover, articulated on the plug portion, is the only component which can be moved through a simple linear plugging movement. Complicated movement sequences to reveal the connector pin are not required, the connector pin being rather revealed directly during the insertion movement. With that, it is also reliably ensured that the high precision machined and relatively sensitive connector pin is only revealed if it is already situated within the protective sleeve portion. With that, amongst other things, for example inadvertent eye damage resulting from a laser beam emerging from the connector pin is also prevented.

The cover is preferably mounted to be able to pivot on the plug portion and possesses a guide piece, the control path being at least one guide member which coordinates with the guide piece in order to pivot the cover. By this means, the cover can be moved with an extremely slight force, which in practice is no greater than the insertion force which is anyway required.

Alternatively, however, the lid can also be mounted on the plug portion to be able to both pivot and slide, and it can possess a guide piece, the control path being at least one guide groove which coordinates with the guide piece in order to pivot and slide the cover. This combined pivot/slide movement of the cover has the advantage that the lid can be accommodated within the sleeve portion in a space saving way.

Instead of a circular path, the outer edge of the cover inscribes a curved path requiring considerably less space.

The combined movement of the cover can be realised in a particularly simple way if the guide piece possesses at least one linkage element which both rotates and slides in a guide slot on the plug portion, and if it possesses at least one engagement member which engages, when the cover is closed, in the guide groove on the sleeve portion. A linkage element and an engagement member also ensure precise guidance, even when movement sequences are rapid. The guide piece and the guide groove cooperate, with advantage, in such a way that the cover is retracted into its open position behind the plane of the face of the connector pin. This enables the plug to be inserted into a sleeve portion from both sides in such a way that the opened covers lie opposite one another in the same plane. Rotation of the plug through 180° for overlapping of the lid is not required.

In the open position, the cover is preferably pivoted through approximately 90° relative to the closed position. In this position it requires relatively little space in the sleeve portion. This applies particularly for flat shaped covers. Other relative angles would also be conceivable in the opened position.

Preferably, the cover is preloaded under spring tension into the closed position, so that it always reliably closes when the plug portion is withdrawn. The spring preloading can be produced in totally varying ways. It would be conceivable to mount a coiled spring on the pivot axis, a spring clip or also a step bearing which is formed in such a way that it exerts a spring action in a certain direction as a result of the elasticity of the material.

The cover can also be preloaded in the closed position by means of a sprung cam which presses with spring action against the face and/or against the longitudinal side of the plug portion. This type of sprung cam has the advantage that it can be formed integrally with the cover and therefore that the spring preloading requires no additional parts.

The cover can in principle be formed as a disc, but can also be curved as a bow. In the latter case, it is possible to mount it to be able to slide on a curved track on the plug portion.

The cover can press either directly against the face of the connector pin, or against an end portion which surrounds the connector pin. It is particularly advantageous if the inner side of the cover, oriented toward the plug facing side, is inclined, at least in the area of the connector pin, in relation to the optical axis of the optical fiber within the connector pin in such a way that reflection of light back into the optical fiber is prevented.

As a rule, the control path is preferably arranged, for reasons of space, within the sleeve portion. In certain cases the kinematic reversal of this principle would be conceivable without problems, so that the control path, for example a guide groove or a guide member, is arranged on the cover, whilst a guide element, for example in the form of a guide cam, is provided on the sleeve portion.

Further advantages and individual features of the invention are apparent from the following descriptions of embodiments, and from the drawings.

Figure 1:
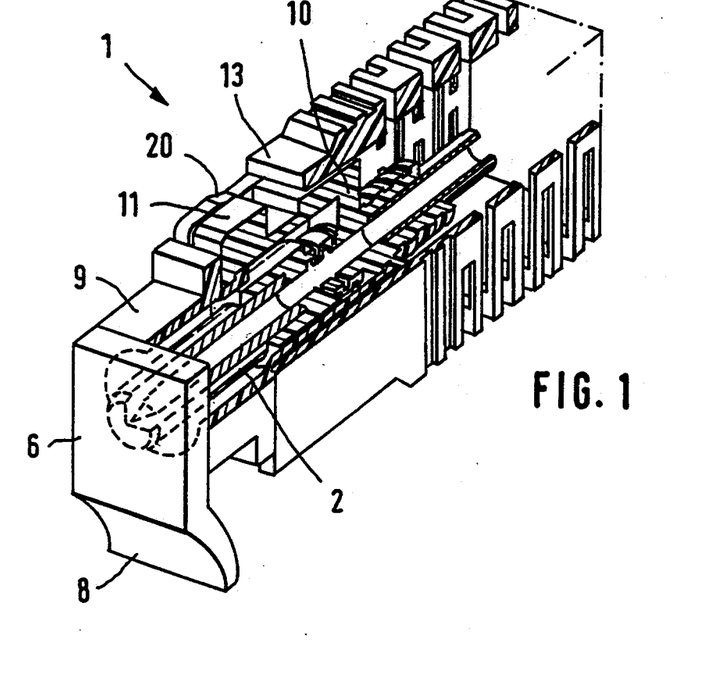
FIG. 1 is a plug portion in a perspective representation.

A plug portion 1 is shown in FIG. 1, the plug housing 13 of which possesses in principle an approximately rectangular cross section. The connector pin 2 is held in a pin holder 10 which possesses an end portion 9, said end portion possessing a bore, the inner wall of which surrounds the connector pin. The actual plug housing 13 is mounted on the pin holder 10 to be able to axially slide along a small distance. A locking shoulder 11, which lies approximately at the same height as an incline 20 which forms part of the plug housing 13, is in each case arranged on the pin holder on two opposing sides, above and below.

A cover 6, which possesses the same cross sectional area as the end portion 9, is mounted to be able to pivot on the facing side of the end portion 9. On one side a guide piece 8 is arranged on the cover 6. The guide piece possesses here an approximately horn type configuration.

Figure 2:
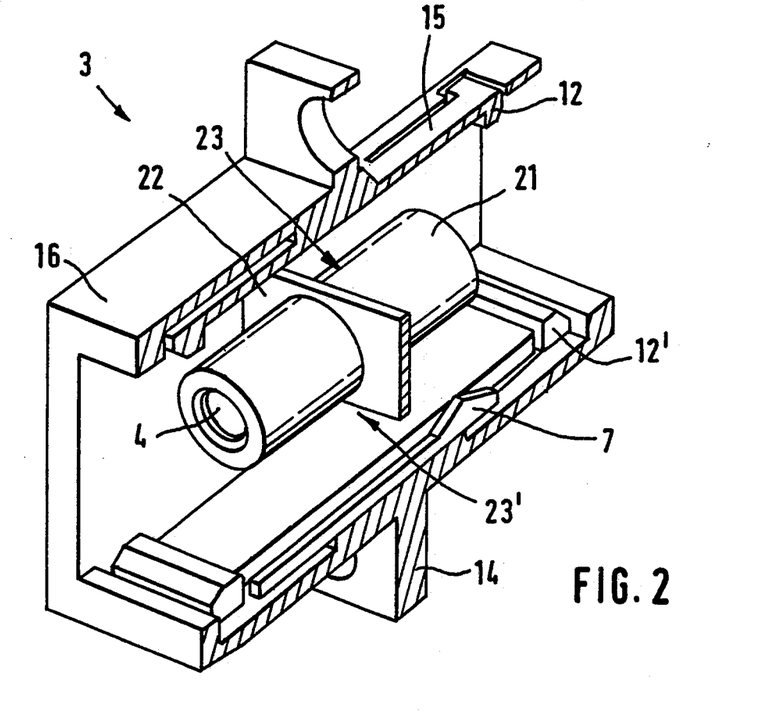
FIG. 2 is a sleeve portion for receiving the plug portion according to FIG. 1.

FIG. 2 shows a sleeve portion 3 for receiving the plug portion 1. The sleeve portion has in principle a hollow box shaped sleeve housing 16 which is provided with a flange 14 for fixing to a housing wall. On the inside of the sleeve housing the actual sleeve 4, for receiving the connector pin, or pins, is held in a sleeve holder 21. Preferably, the sleeve is held to float in the sleeve holder. Sprung tongues 15, on the ends of which a locking catch 12 is located, are arranged on the sleeve housing 16. A control path, which here takes the form of parallel guide members 7, is provided on the inside of the sleeve housing.

The sleeve holder 21 is held fast in the sleeve housing 16 with the aid of a holding wall 22. The holding wall is dimensioned in such a way that, both above and below, it leaves free the openings 23, 23' which extend over the entire width. These openings serve the purpose of accommodating the swung open cover 6 of an inserted plug portion 1, as will next be described.

Figure 3:
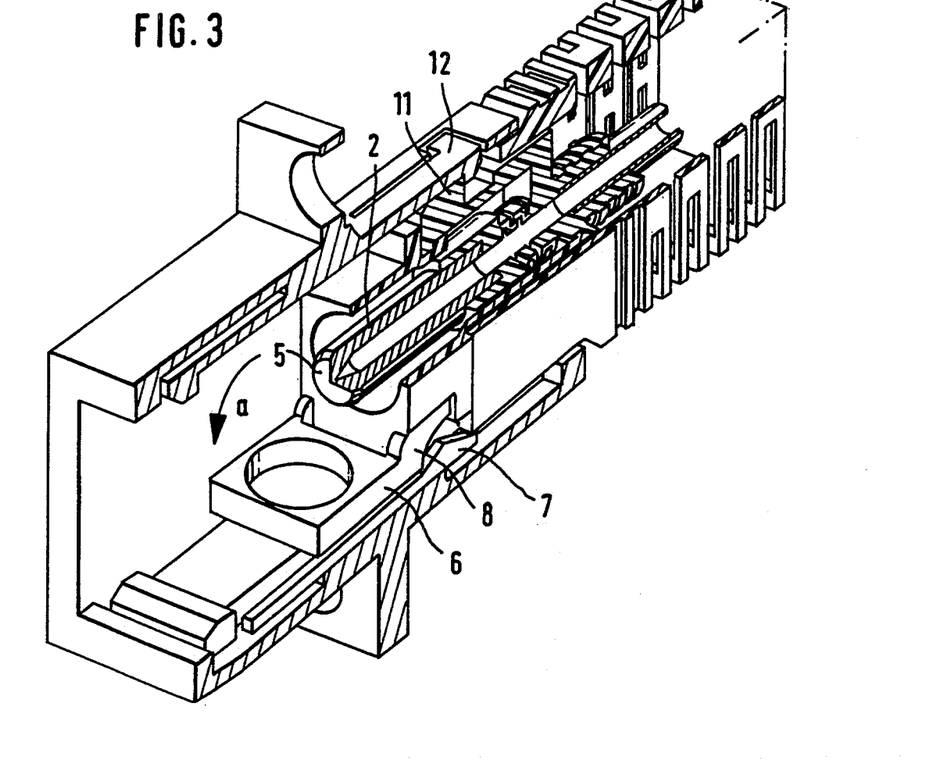
FIG. 3 depicts the plug portion according to FIG. 1 in inserted condition, however without sleeve.

The plug connector with inserted plug portion is shown in FIG. 3. During introduction of the plug portion, the guide piece 8 of the cover 6 strikes the guide member 7, the cover 6 being pivoted over in the direction of the arrow a. For reasons of increased clarity, the actual connector sleeve 4 is not shown in FIG. 3. The connector pin 2, however, penetrates into the connector sleeve 4 in the process of the insertion movement, its facing side 5 meeting with the facing side of a neighbouring connector pin within said connector sleeve.

On reaching the required insertion depth, the locking catch 12 engages behind the locking shoulder 11, by which means the plug portion is secured in the sleeve portion. In the case of the embodiment represented, a so-called Push-Pull closure is involved. This engagement device can only be released if the tension force to withdraw the plug portion is exerted on the plug housing 13. With that, the plug housing 13 slides back somewhat relative to the pin holder 10, the incline 20 raising the locking catch 12 so that the locking shoulder 11 is released (FIG. 1). On the other hand, if the tension force is exerted onto the cable, which is not shown here, and thus onto the pin holder 10, the locking catch cannot be disengaged. This type of closure for optical connectors is already known. Naturally, the fastening of the plug portion on the sleeve portion can ensue in other ways, for example with the aid of a ring nut.

When withdrawing the plug portion from the sleeve portion, the guide piece 8 must once again slide over the guide member 7, the cover 6 once again being returned to its closed position. The cover 6 is preferably manufactured from a plastic material and shaped in such a way that it can merely be engaged in the end portion 9. The cover 6 must not necessarily be pivoted back via the guide member. It is easily conceivable for the closing movement to ensue merely through a return spring, with the aid of a suitable spring element.

Figure 4:
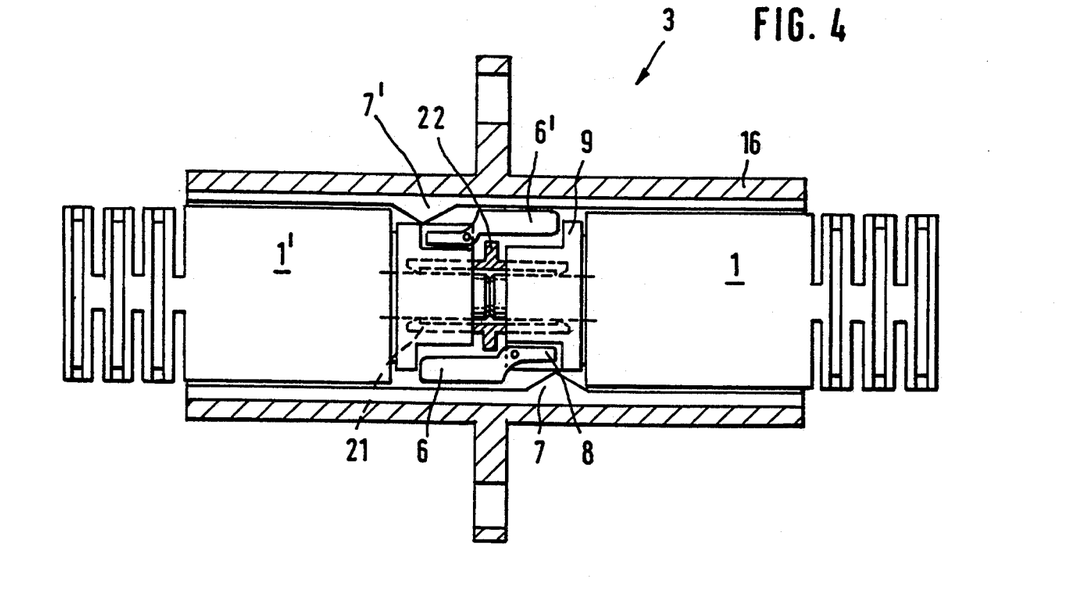
FIG. 4 is a cross section through the sleeve portion according to FIG. 2 with plug portions inserted from both sides.

FIG. 4 schematically shows a sleeve portion 3 according to FIG. 2, in which a plug portion 1, 1' is inserted from both sides. As can be seen from this figure, this sleeve portion possesses not only a pair of guide members 7 on the underside, but also a pair of guide members 7' on the upper side, indeed arranged to be symmetrically displaced in relation to the plane of contact between both the connector pins. The plug portion 1' is inserted, rotated through 180° in relation to the plug portion 1, the outer contour of the plug housing and the inner contour of the sleeve housing being so shaped that both plug portions can only be inserted in this position. Both the covers 6 and 6' of the plug portions 1 and 1' overlap in their inserted condition, and slide through the openings 23 and 23', according to FIG. 2. Naturally, however, two identical plug portions must not necessarily be inserted into the sleeve portion 3. It would be conceivable, to insert a plug portion without a cover into one side, for example if this plug portion is within a housing and must be practically never removed.

Figure 5:
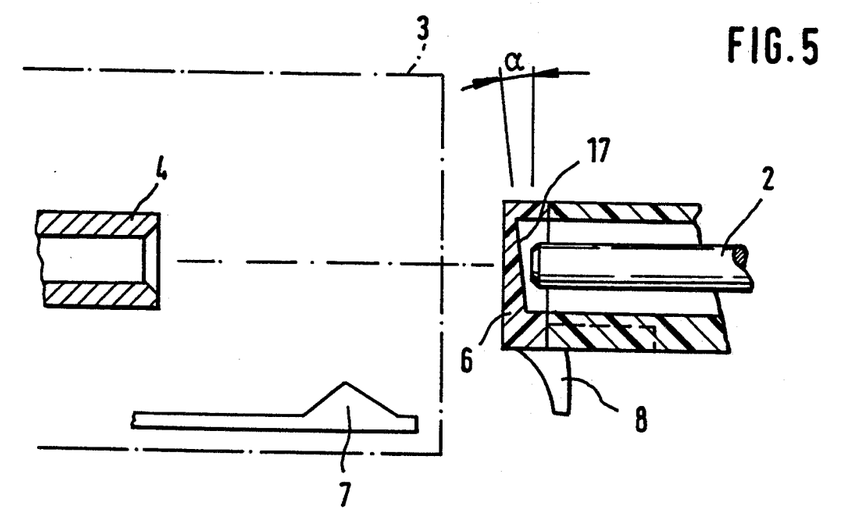
FIG. 5 is a schematic principle representation of the plug connector according to FIGS. 1 to 3.

FIG. 5 shows, once again schematically, a part of the sleeve 4 and the guide member 7 in the sleeve portion 3, as well as a cover 6 with the guide piece 8. The cover is formed as a cap, the inner wall 17 of the cover being inclined relative to the plug facing side through an angle of $\alpha$, in order to avoid a return of light back into the optical fiber through reflection. The angle $\alpha$ can, for example, amount to approximately 7°. Naturally, the geometrical relationship between the sleeve 4, the guide member 7 and the cover 6 must be so selected that the cover 6 is flapped up in time, before reaching the sleeve 4. The cover then slides partially beneath the sleeve 4.

Figure 6:
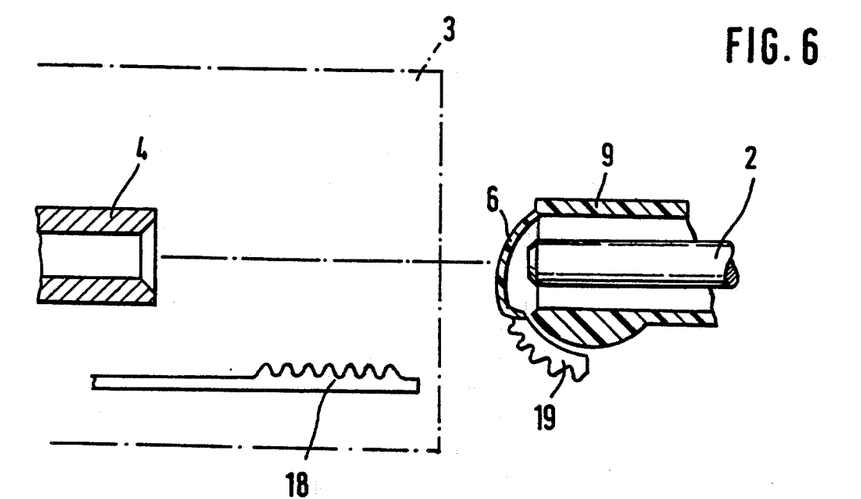
FIG. 6 is a schematic representation of an alternative plug connector.

An alternative embodiment of the invention is shown schematically in FIG. 6, the control path does not here comprise a guide member, but a toothed rack section 18. The cover 6 is curved in a bow shape and mounted to slide on a circular bowed track on the end portion 9, for example in side grooves or similar. In place of a guide piece, the cover possesses a toothed segment 19 which meshes with the geared rack 18 during insertion of the plug portion into the sleeve portion. Thereby, the cover 6 is slid open and the connector pin 2 is revealed before it reaches the sleeve 4.

Naturally, the cover closure according to the invention can be realised not only on plug portions with rectangular cross section. Also plug portions with round cross section can be provided with a moveable cover in the same or a similar way, said cover being likewise then in principle circularly formed. The sleeve portion also does not necessarily need to be a separate component. It would also be conceivable that the sleeve portion is a direct constituent of a plug portion.

In FIG. 7 to 12, a further embodiment of the invention is shown, with which the cover undergoes a combined pivot and sliding movement. Fastening and release of the plug portion in the sleeve portion is also solved in a different way here. The same types of components possess the same defining numbers as preceding embodiments.

Figure 7:
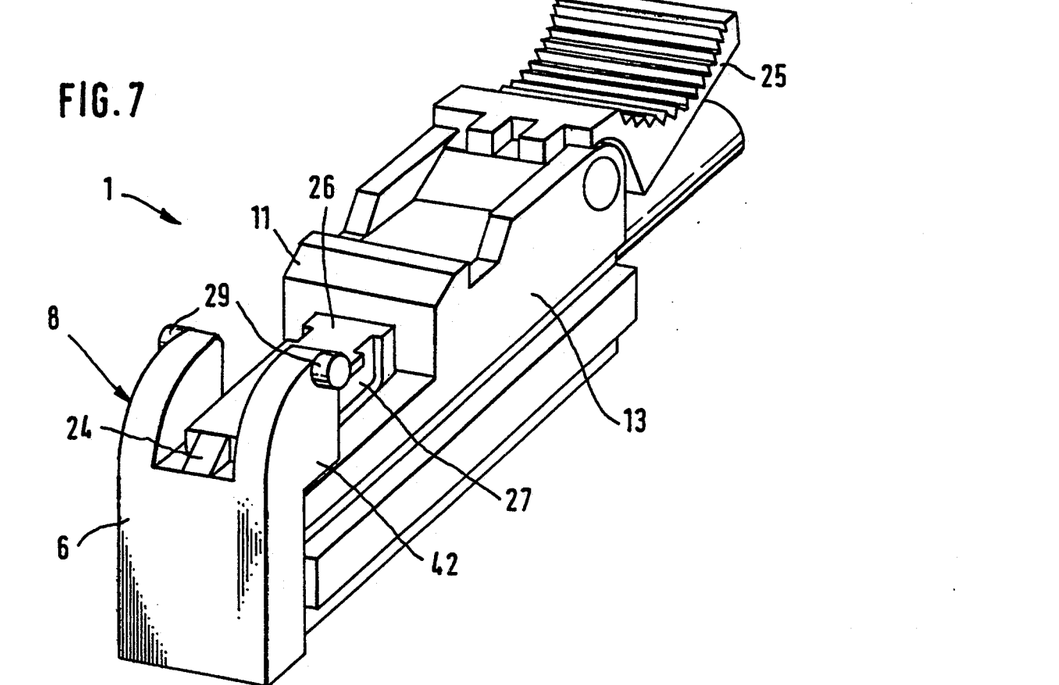
FIG. 7 shows an alternative embodiment of a plug portion with pivotable and slideable cover in a perspective represention with closed cover.
Figure 8:
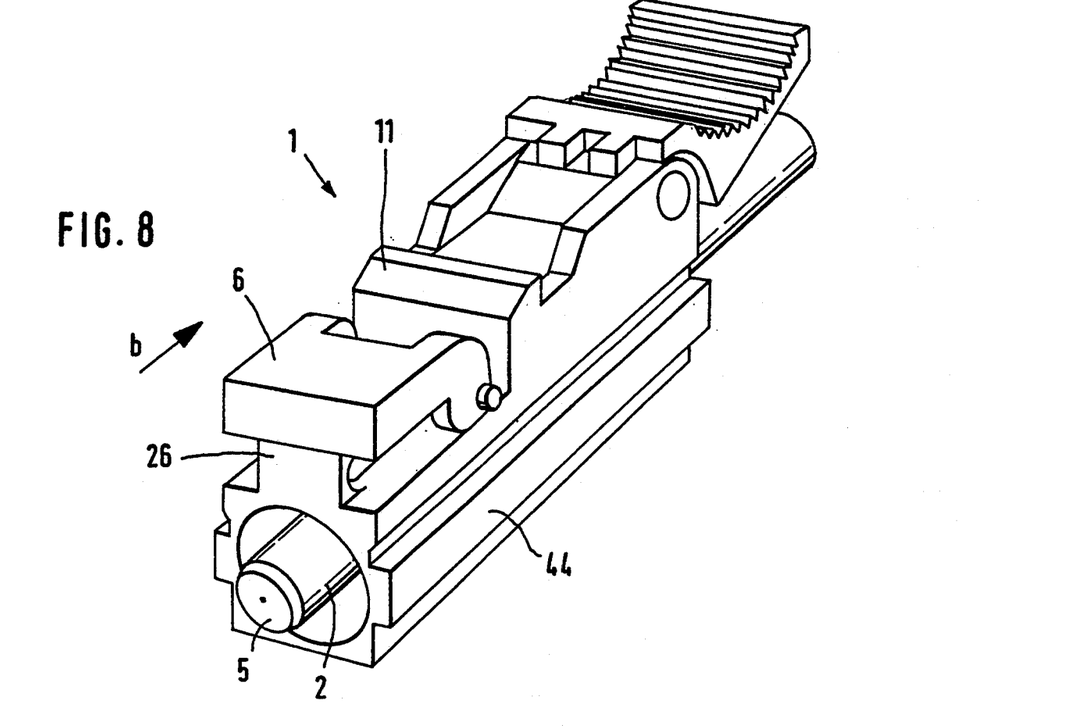
FIG. 8 illustrates the plug portion according to FIG. 7 with opened cover.

In FIGS. 7 and 8, first of all a plug portion 1 is shown which in principle likewise possesses an approximately rectangular plug housing 13. As will subsequently be explained, the pin holder is however not axially displaceable together with the connector pin 2, but firmly held within the plug housing. The plug housing likewise supports, however, a locking shoulder 11 on which the sleeve portion can be latched. A release lever 25 serves for release, the function of which is more exactly explained in the following.

The cover 6 possesses a guide piece 8 in the shape of two wings running at rightangles to the cover 6. Linkage cams 28 (FIG. 12) are arranged, not visible here in this illustration, on the inner side of these wings, said cams engaging, each in a guide slot 27 on the side wall of a prismatic guide strip 26. The slots 27 run upwards and exit in the area of the locking shoulders 11, in order that the linkage cams can be introduced. Guide cams 29 are arranged on the outside of the wings 42 at a distance to the linkage cams 28. These guide cams serve the purpose of moving the cover 6 with the aid of guide grooves 30 (FIG. 12) in the sleeve portion.

In order that the cover 6 remains in the closed position as shown in FIG. 7, a spring cam 24 is arranged between the wings 42, which presses itself against the facing side of the guide strip 26.

FIG. 8 shows a plug portion 1 with opened cover 6. Normally, this position is assumed by the cover 6 only when within the sleeve portion. Naturally, it is also possible, however, to manually pivot the cover upward and slide it back. With that, the cover 6 carries out a pivoting movement about the axis of the linkage cams 28, and simultaneously the linkage cams slide within the guide slots 27 in the direction of the arrow b, backwards towards the locking shoulder 11. The cover 6 is, thereby, withdrawn behind the plane of the facing side 5 of the connector pin 2.

Figure 9:
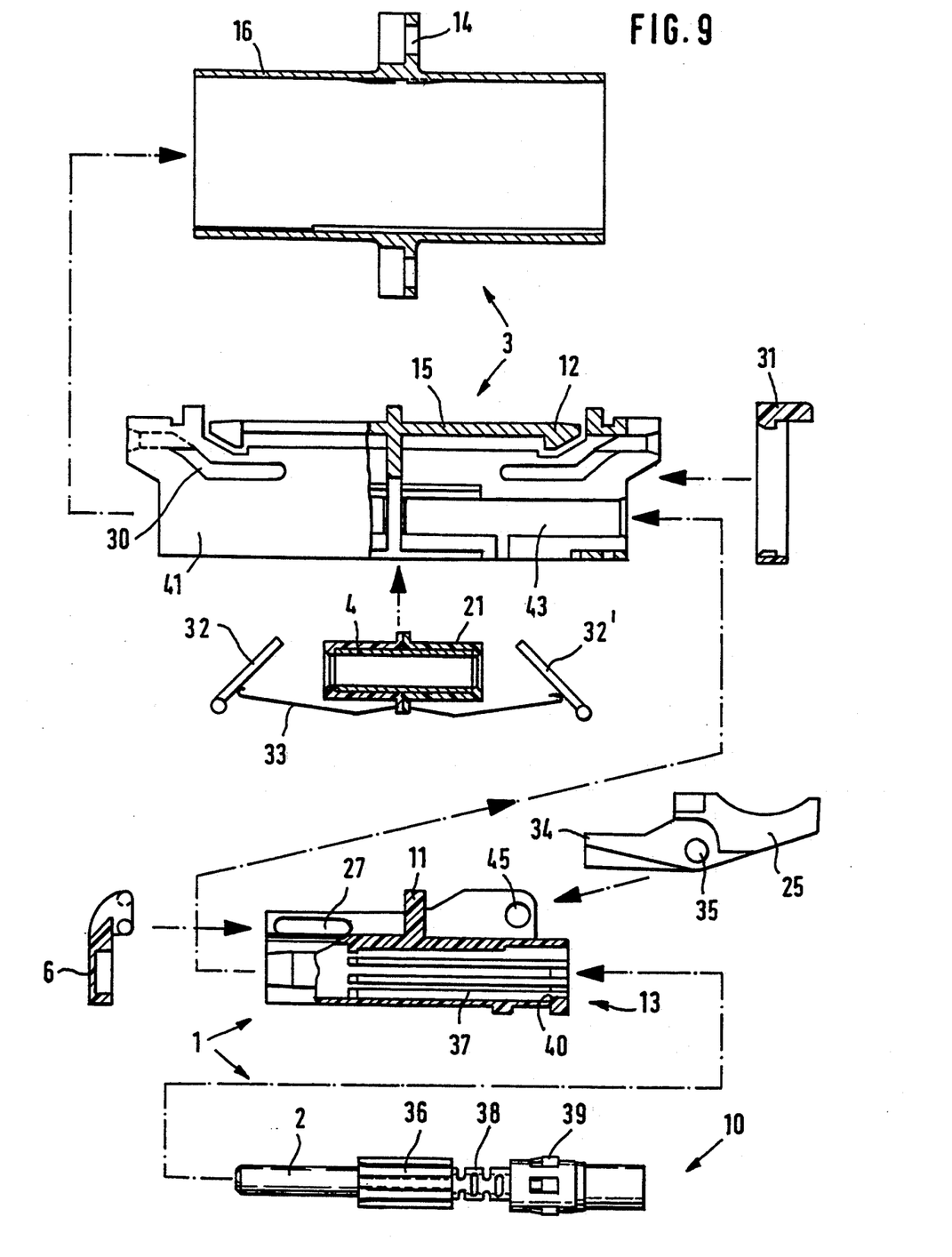
FIG. 9 shows a plug connector with individually depicted components for the plug portion according to FIG. 7.
Figure 10:
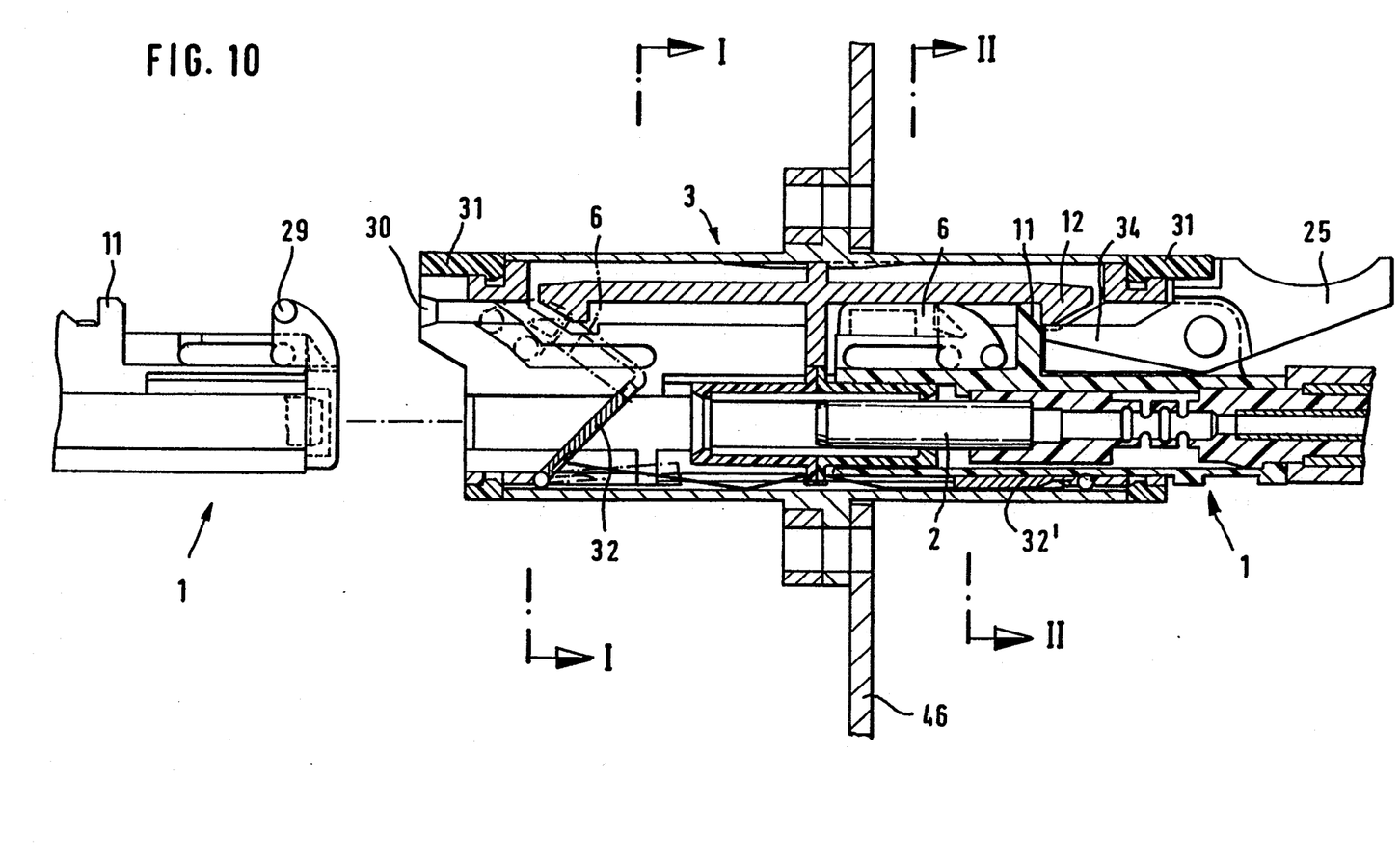
FIG. 10 shows the plug connector according to FIG. 9 in an assembled condition, respectively during insertion of a plug portion.
Figure 11:
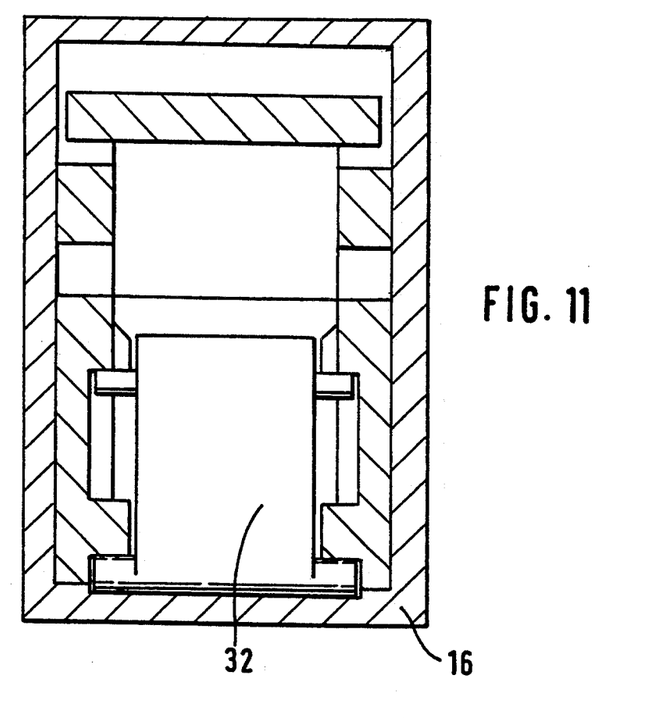
FIG. 11 is a cross section through the plane I—I according to FIG. 10, in an enlarged scale.

FIG. 9 shows the individual parts of a plug connector with the individual components, and FIG. 10 shows a cross section through a plug connector of this type. The sleeve portion 3 is constructed in two parts and comprises an outer sleeve housing 16 with a flange 14, and an inner sleeve housing 41. As can be in particular seen from FIGS. 11 and 12, also the sleeve portion possesses in principle a box shaped cross section. The inner sleeve housing 41 can be slid into the outer sleeve housing 16, being secured on both sides with a snap-on frame 31. The inner sleeve housing 41 is approximately symmetrical in construction and has guide grooves 30 at its sides for receiving and guidance of the guide cams 29 on the guide piece of the cover. In each case, a sprung tongue 15 with a locking catch 12 is provided in order to fasten and secure the plug portion. Side grooves 43 on the inner wall of the inner sleeve housing 41 can receive the side strips 44 on the plug housing 13. In this way, the plug portion cannot be tilted within the sleeve portion.

The sleeve holder 21 with the actual sleeve 4 for the connector pin is inserted from beneath through an opening in the inner sleeve housing 41. After the outer sleeve housing 16 has been slid over, the sleeve holder 21 is secured.

A two armed leaf spring 33 is clamped beneath the sleeve holder 21 which, with its free ends, preloads a protective flap 32. As can be in particular seen from FIG. 11, the protective flap 32 is mounted between the inner sleeve housing 41 and the outer sleeve housing 16 to articulate. These protective flaps prevent light, in particular laser light, from emerging out of a plug inserted only into one of the sides.

The plug portion 1 comprises in principle a plug housing 13, on which the cover 6 and the release lever 25 are fixed. The release lever 25 is engaged with its linkage cam into the openings 45 in the plug housing 13. A lever arm 34 engages, in the inserted condition, under the locking catch 12 on the sleeve portion, so that this can be lifted for release.

Figure 12:
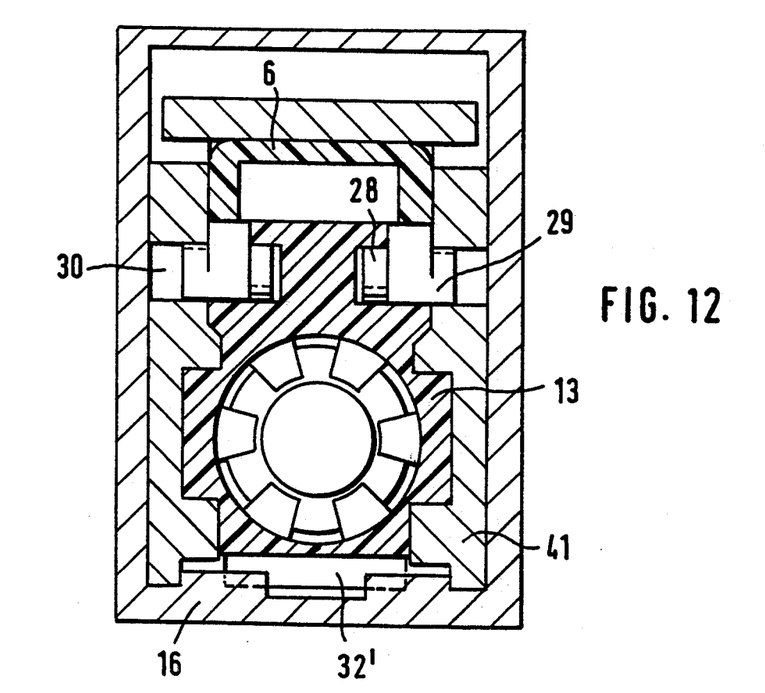
FIG. 12 is a cross section through the plane II—II according to FIG. 10, in an enlarged scale.

As can be particularly seen in FIG. 12, the inside of the plug housing 13 is partly formed as a splined hub 37. The pin holder 10 possesses a section which is formed as a splined shaft 36. Individual splines 39 on a rear section of the pin holder engage on the shoulders 40 of the splined hub, so that the pin holder 10 can be permanently snap located in the plug housing 13. The splined shaft/splined hub connection serves, at the same time, to establish the relative angled position of the connector pin. In the case of six individual splines, and spline grooves, six possible angled positions will result for the connector pin in the plug housing 13. In relation to the centre axis of the optical fiber, the most optimal position can be selected through a measurement procedure, so that that within one plug connector, the most favourably toleranced pair in relation to the eccentricity of the optical fiber will match.

The pin holder 10 is preferably integrally manufactured from plastic material and has a sprung section 38, so that the connector pin 2 is sprung in relation to the plug housing 13.

FIG. 10 shows a sleeve portion 3 in an assembled condition, which for example is fixed to a wall 46 of the housing. A plug portion 1 is already inserted on the right hand side and locked, the cover 6 being arranged axis parallel between the guide strip 26 of the plug housing and the tongue 15 of the inner sleeve housing 41. The connector pin 2 penetrates into the sleeve 4. In this position also the protective flap 32 is pressed axis parallel downwards against the force of the leaf spring 33.

On the left side of the plug connector, a front section of a plug portion 1 is shown, inserted into the plug connector. The cover 6 is initially in its closed position.

During insertion of the plug portion 1 into the sleeve portion 3, the guide cams 29 engage in the guide grooves 30, which is somewhat facilitated by a wedge shaped extension. The guide grooves 30 have a track run which first of all runs axis parallel and then runs inclined towards the centre axis of the plug connector, and then once again runs axis parallel. In the inclined section, the guide cams are pressed downwards, whereby the pivoting movement of the cover 6 is initiated. The intermediate position of the cover 6 in this inclined section is depicted by means of the dotted line. Simultaneously, the movement of the cover in relation to the plug housing 13 is delayed so that the cover is pulled to the rear. Naturally, in the process of the insertion movement, the protective flap 32 is also continuously pressed downwards until it assumes its end position. As soon as the plug portion 1 has reached its end position, in which the facing sides of the opposing connector pins lie opposite each other, the locking catch 12 engages behind the locking shoulder 11.

In order to withdraw a plug portion from the sleeve portion, merely the release lever 25 must be pressed downwards, the locking catch 12 being raised via the lever arm 34 thus releasing the locking shoulder 11. Naturally, here also another type of release can be realised for the plug portion, for example with the Push-Pull system described in the introduction.

Inasmuch as the invention is subject to modifications and variations, the foregoing description and accompanying drawings should not be regarded as limiting the invention, which is defined by the following claims and various combinations thereof:

We claim:

1. In an optical fiber connector comprising a plug (1) having at least one connector pin with an optical end surface and a receptacle (3) having at least one sleeve for receiving the connector pin, the plug portion including a shield for protecting the end surface of the connector pin, said shield having a hinge connection with the plug so that it can swing from a closed position covering said end surface to an open position exposing said end surface, the improvement wherein said hinge connection includes an element which is slidably mounted in the plug, and the cover has a guide piece, extending beyond the hinge connection, which engages a protrusion in said receptacle as the plug is inserted, causing the cover to pivot, exposing the pin, and to move rearward.

2. A connector as recited in claim 8, wherein the cover pivot approximately 90° between its open and closed positions.

3. A connector as recited in claim 1, wherein the plug has an end portion (9) beyond out of which the connector pin protrudes, and the cover, in its closed position, bears against the end surface of the end portion.

4. A connector as recited in claim 1, wherein the cover has an inner face oriented at an angle with respect to the end surface of the pin, to prevent reflection of light from the inner face back into the optical fiber.

5. A connector as recited in claim 1, wherein the plug includes a housing having an approximately rectangular cross section.

6. A connector as recited in claim 1, wherein the sleeve portion is a central component which can be mounted on a housing wall, and the plug portion can be slid into said central component from both sides, and a separate control path is provided for each plug portion in the sleeve portion.

7. A connector as recited in claim 1, further comprising means for latching the plug in the receptacle.

8. A connector as recited in claim 1, wherein the plug has a guide slot and the slidably mounted element has a protruding cam which slides in the slot.

9. A connector as recited in claim 8, wherein the receptacle ha a guide groove and the slidably mounted element has an engagement member which is received in the guide groove when the plug is inserted.

10. A connector as recited in claim 9, wherein the guide groove is configured so that the cover is retracted into the open position behind the plane of the end surface of the pin.

11. A connector as recited in claim 8, further comprising a spring biasing the cover towards its closed position.

12. A connector as recited in claim 11, wherein the spring is a spring cam compressed against a surface of the plug when the cover is closed.

* * * * *